June 9, 1931.     C. A. SCHELLENS     1,808,792
LUBRICATING DEVICE
Filed Dec. 28, 1926
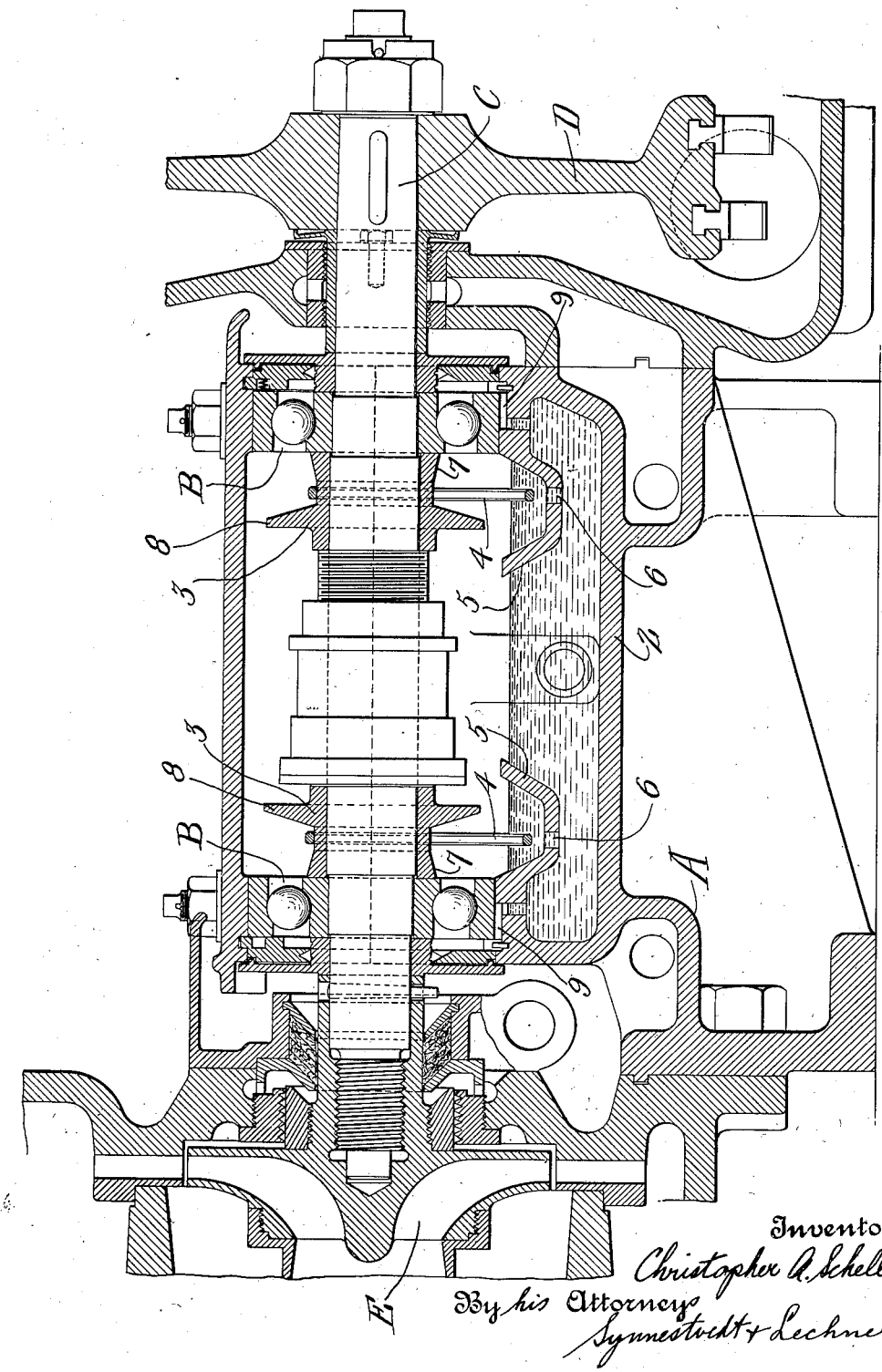
Inventor
Christopher A. Schellens
By his Attorneys
Synnestvedt & Lechner Patented June 9, 1931

1,808,792

UNITED STATES PATENT OFFICE

CHRISTOPHER A. SCHELLENS, OF MARBLEHEAD, MASSACHUSETTS, ASSIGNOR TO C-S ENGINEERING COMPANY, OF JERSEY CITY, NEW JERSEY, A CORPORATION OF DELAWARE

LUBRICATING DEVICE

Application filed December 28, 1926. Serial No. 157,526.

This invention relates to lubricating devices, and particularly to those employing oil reservoirs from which a moving part takes oil to deliver it to the part or parts requiring lubrication. The invention is especially useful in centrifugal pumps.

Where such an oil reservoir is employed, in course of time foreign particles collect in the oil, and, since the oil is agitated or churned, this foreign matter is kept continually in suspension and is carried along with the oil to the surfaces to be lubricated, which, of course, is detrimental from the standpoint of wear, the more dirty the oil becomes, the greater the wear. This is particularly objectionable where ball bearings or the like are employed.

One of the primary objects of my invention is to overcome these difficulties and to extend the intervals between drainings of the oil in the reservoir and replacement thereof with fresh oil.

More specifically, I localize the churning effect leaving the main body of oil in the reservoir unagitated, thus affording opportunity for the foreign matter to settle.

How the foregoing, together with such other objects and advantages as may hereinafter appear, or are incident to the invention, are realized is illustrated in preferred form in the accompanying drawing, wherein:—

The figure is a fragmentary longitudinal section through the improved lubricating device as applied to a centrifugal turbine and pump set.

Referring to the drawing, it will be seen that the particular device with which the invention is associated comprises, in general, a split casing or supporting structure A in which the anti-friction bearings B, B are mounted, a shaft C, a turbine runner D secured at one end of the shaft, and a pump runner E secured at the other end of the shaft.

The improved lubricating device comprises an oil reservoir 2, in this instance formed as an integral part of the casing A, an oil directing member 3 for each bearing B, said members being secured to rotate with the shaft C, oil rings 4, 4, hanging from the members 3, 3, and dipping into the oil in the reservoir, and cup or trough-like members 5, 5, in this instance shown cast integral with the casing A.

The trough-like members 5 are spaced above the bottom of the reservoir with their sides extending somewhat above the normal level of the oil contained in the reservoir, and are located beneath the oil rings 4. These members are provided with apertures 6 in the bottom thereof whereby oil from the reservoir proper enters the members. It will, therefore, be seen that the members 5 serve to segregate a portion or body of oil from the remainder of the oil in the reservoir, and that the oil rings, by virtue of their relation to the trough-like members, pick up oil from said members and deposit it on the directing members, which, in turn, deliver it to the bearings B. In this connection, it is pointed out that the directing members 3 have cone-like portions 7 along which the oil deposited thereon by the oil rings creeps and is led to the bearings. These members are also provided with flanges 8 functioning as flingers which cause oil deposited thereon to be whirled around, thus filling the casing with a sort of spray or fog. In other words, the flinger serves to atomize, so to speak, some of the oil which finally deposits on the bearings in a fog. The oil which passes the bearings is drained into the main body of oil through passages 9.

From the foregoing it will be seen that the agitation of the oil is confined to the body of oil in the trough-like member 5. Thus, the main body of oil in the reservoir is not agitated, the only circulation therein being that caused by a very gentle flow through the opening 6 in the bottom of the member 5. By such an arrangement any suspended matter, such as grit or fine metallic particles, will settle in the main body of oil and, therefore, will not be carried around in the oil, which greatly increases the life of the bearings. The device is particularly useful where ball bearings are employed, as it has been found that one of the principal causes of trouble in ball bearings is grit and very fine suspended material in the lubricant. When following the usual practice, the entire lubricant in the reservoir is stirred into agitation which prevents settling of the objectionable matter.

It is to be understood that to still further insure the settling of the suspended particles, felt pads could be employed under the channel or trough-like members 5.

While the trough-like member 5 is shown and described as being cast integral with the casing, it is to be understood that in some instances it may be desirable to construct these members as separate pieces, as would be the case in applying the improvement to the reservoir of an existing lubricating device.

I claim:—

1. In combination with a shaft and its bearing, of means for lubricating the bearing including an oil reservoir, an oil ring for picking up oil from said reservoir, and an oil directing member on which the oil ring deposits oil, said member having a cone-like portion for leading oil to the bearing, and a flanged portion for spraying oil over the bearing in the form of fog.

2. A lubricating device for bearings comprising, in combination, an oil reservoir, a trough in said reservoir spaced above the floor thereof, said trough having an opening at the bottom thereof establishing communication between the reservoir and trough, moving pick-up means dipping into the trough, and rotating means to which said pick-up means delivers oil, said rotating means having a flange-like portion adapted to spray oil over the bearing in the form of fog.

3. In combination with a shaft and its bearing, of means for lubricating the bearing including an oil reservoir, an oil ring for picking up oil from said reservoir, and rotating means supplied with oil by said oil ring said rotating means having a flange-like portion adapted to spray oil over the bearing in the form of fog.

In testimony whereof I have hereunto signed my name.

CHRISTOPHER A. SCHELLENS.